United States Patent [19]

Damouth

[11] 4,318,111

[45] Mar. 2, 1982

[54] TWO SECTION CHARGING ELECTRODES FOR BINARY INK DROP PRINTERS

[75] Inventor: David E. Damouth, Rochester, N.Y.

[73] Assignee: Xerox Corporation, Stamford, Conn.

[21] Appl. No.: 193,558

[22] Filed: Oct. 3, 1980

[51] Int. Cl.[3] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,373,437 | 3/1968 | Sweet | 346/75 |
| 3,701,998 | 10/1972 | Mathis | 346/75 |
| 3,975,741 | 8/1976 | Solyst | 346/75 |
| 3,984,843 | 10/1976 | Kuhn | 346/75 |
| 4,035,812 | 7/1977 | Van Breemen et al. | 346/75 |
| 4,074,278 | 2/1978 | Robertson | 346/75 |
| 4,274,100 | 6/1981 | Pond | 346/75 |

*Primary Examiner*—Joseph W. Hartary

[57] ABSTRACT

A binary ink drop printer is disclosed of the type wherein continuously generated drops are electrostatically deflected to intersect either a target or a gutter. The printer includes M×N number of nozzles for generating drops and a like number of charging electrodes for charging drops to either a print level for flight to the target or a gutter level for flight to a gutter. A M×N matrix is used to couple voltages to the charging electrodes and thereby greatly reduce the number of electrical connections to a substrate carrying the M×N number of charging electrodes. Each charging electrode includes two sections. Application of a print voltage to both sections causes the generation of a print drop that goes to the target and application of a gutter voltage to either or both sections of the charging electrode causes the generation of a gutter drop that is collected in the gutter. One two section electrode is made using at least two partial cylinders. Another two section electrode is made by coupling a single electrode to a voltage divider network.

9 Claims, 9 Drawing Figures

FIG. 3
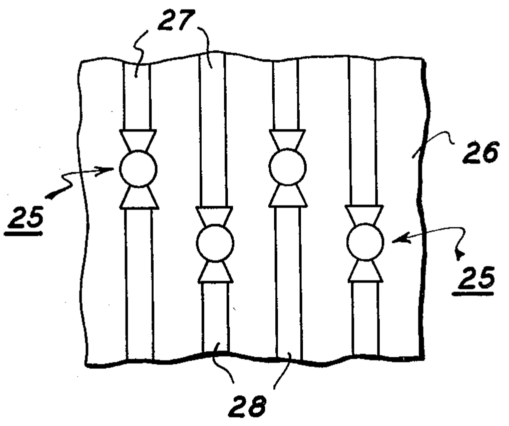
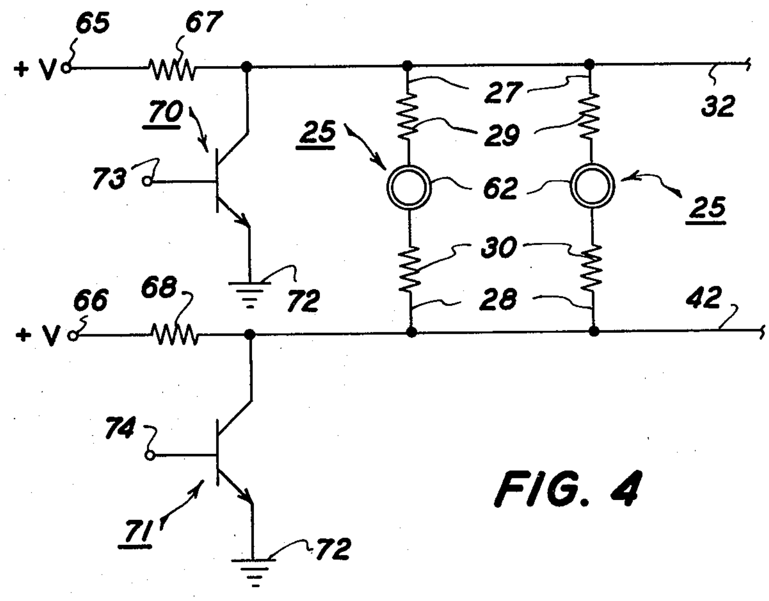
FIG. 4
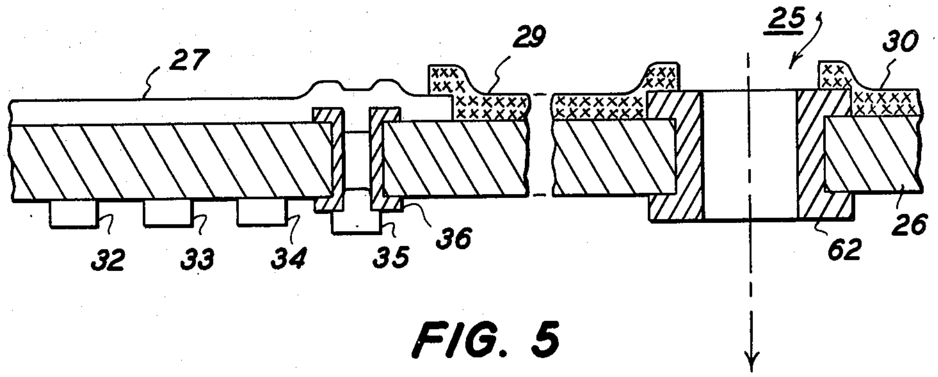
FIG. 5

TWO SECTION CHARGING ELECTRODES FOR BINARY INK DROP PRINTERS

BACKGROUND

This invention relates to ink drop printing method and apparatus wherein continuous streams of drops are generated from liquid emitted under pressure through a nozzle. Selected drops are electrostatically charged and deflected between flight paths intersecting either a target to be printed or a drop collection gutter. More specifically, this invention relates to method and apparatus for reducing the amount of electrical connections necessary for charging ink drops in binary printers having high numbers of nozzles.

As used herein, a binary printer is one wherein each nozzle supplies ink drops to cover a single point or pixel in a scan line of a raster pattern used to form an image on a target. An individual drop either goes to the pixel associated with its nozzle or a gutter. Typically, a print drop is charged to a print level to reach the target and is charged to a gutter level to intercept the gutter. For example, a zero charge level may be the print level and some positive charge level of a significant non-zero magnitude may be the gutter level or vice versa.

A multiple nozzle binary printer places a burden on the complexity of the wiring and electronic circuitry needed to electrically address a high number of nozzles. For example, a rectangular raster pattern made up of scan lines having 3000 pixels or points requires a binary ink drop printer to have 3000 nozzles to cover each of the pixels. Each nozzle must be electrically addressed to set a drop to either of the binary charge levels: a print level or a gutter level. Conventionally, this requires that 3000 electrical connections be made to charging electrodes associated with each nozzle. Compounding the difficulty and complexity of such binary printers is that the nozzles are packed at a density of from about 20 to about 200 nozzles per centimeter (cm).

SUMMARY

Accordingly, it is a main object of this invention to improve the method and apparatus of electrically addressing the charging electrodes of multiple nozzle, binary ink drop printers of the foregoing type.

Another object of this invention is to devise charging electrode means that is suited for the binary charging of drops in binary printing systems.

Still another object of the invention is to apply a matrix addressing scheme to multiple charging electrodes to reduce the complexity of electrically addressing a plurality of charging electrodes in a binary ink drop printer.

Finally, it is an object here to design a two section charging electrode suitable for a binary ink drop printer.

These and other objects of the invention are realized by dividing a charging electrode into two sections. The individual charging electrodes are addressed by coupling segment and data lines of a square matrix network to the first and second sections of the charging electrodes.

In one embodiment, a two section charging electrode is made by cutting a cylindrical electrode into halves. Each half of a cylinder is electrically isolated from the other. A bias or potential coupled to both of the half-cylinders charges a drop to twice the level of the same voltage applied to just one half-cylinder. The reason is that the capacitance is doubled even though the voltage remains the same as predicted by the equation $Q=VC$. Q is equal to charge; V is equal to voltage; and C is equal to capacitance.

In another embodiment, a two section charging electrode is made by coupling two separate resistors to a charging electrode tunnel in a voltage divider arrangement. Like voltages applied to both ends of the divider network couple a potential to the tunnel equal to the applied voltage. A like voltage coupled to one end with the other end grounded, for example, couples a potential of half the magnitude (assuming a symmetrical divider) to the charging tunnel.

In either embodiment, the print voltage—for example ground potential—is simultaneously applied to both sections of the charging electrode to charge a drop to the print level. A gutter voltage—for example +50 volts—coupled to either or both sections of the charging electrode causes a drop to be charged to a gutter level proportional to either +25 or +50 volts.

REFERENCES

Binary ink drop printing systems are disclosed in U.S. Pat. Nos. 3,373,437; 3,701,998; 3,984,843; 4,035,812 and 4,074,278. U.S. Pat. No. 3,975,741 discloses a plural charge electrode structure suited for application in a binary printing system and specifically refers to the above U.S. Pat. No. 3,373,437 patent as an example of a binary system.

None of the above references disclose: matrix addressing, two section charging electrodes; or a combination thereof. U.S. Pat. No. 3,701,998, in its FIG. 2 illustrates the numerous electrical connections required by prior art binary printers. See items 92, 94, 96 and 98 in FIG. 2.

U.S. Pat. No. 4,074,278 does disclose a charging electrode in a U-shape. The U-shaped electrode is merely a single section electrode. U.S. Pat. No. 4,035,812 discloses a current limiting resistor coupled to a charging electrode. U.S. Pat. No. 3,984,843 discloses a charging electrode array mounted on a silicon substrate. The substrate includes a shift register and latch circuit for coupling signals to the charge electrodes. None of these teachings alone or in combination show or make obvious the present invention however.

THE DRAWINGS

Other objects and features of the invention are apparent from the complete specification, the claims and the drawings, taken alone or in combination with each other. The drawings are:

FIG. 3 is a partial plan view schematic of a variation of the electrodes in FIG. 2 having adjacent charging electrodes displaced to form interleaved arrays of electrodes suited for the printer of FIG. 1.

FIG. 4 is a schematic of electrical circuits coupled to charging electrodes including a voltage divider network defining one embodiment of a two section charging electrode according to this invention.

FIG. 5 is a side sectional view of the apparatus shown in FIG. 2 taken along lines 5—5.

Figure 7:
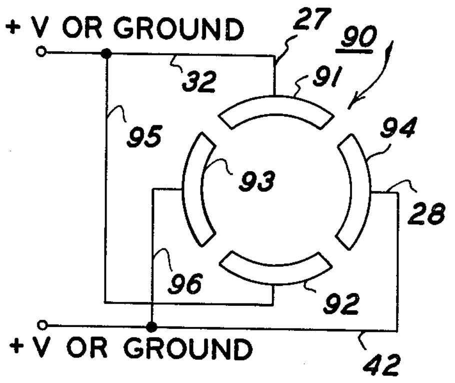

FIG. 7 is an enlarged schematic of another two section charging electrode made with four quarter-cylinders. Each section is composed of two quarter-cylinders. This multiple, partial-cylinder device is another embodiment of this invention.

Figure 6:
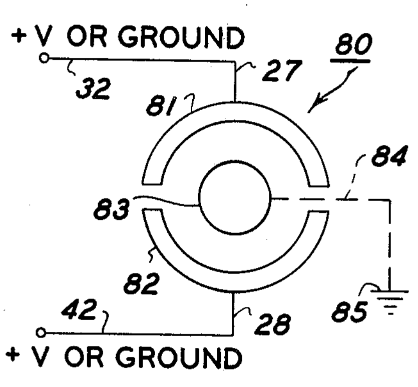
FIG. 6 is an enlarged schematic of a two section charging electrode made with two half-cylinders of a conductive material with an ink drop located at the axis of the half cylinders. The two half-cylinder device is another embodiment of this invention.
Figure 8:
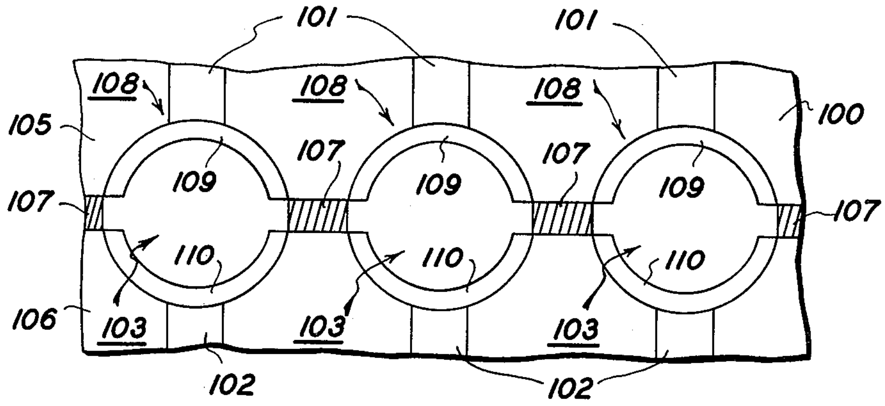

FIG. 8 is a schematic of an array of charging electrodes of the type shown in FIG. 6 and a supporting substrate illustrating one method of manufacture for the array.

Figure 9:
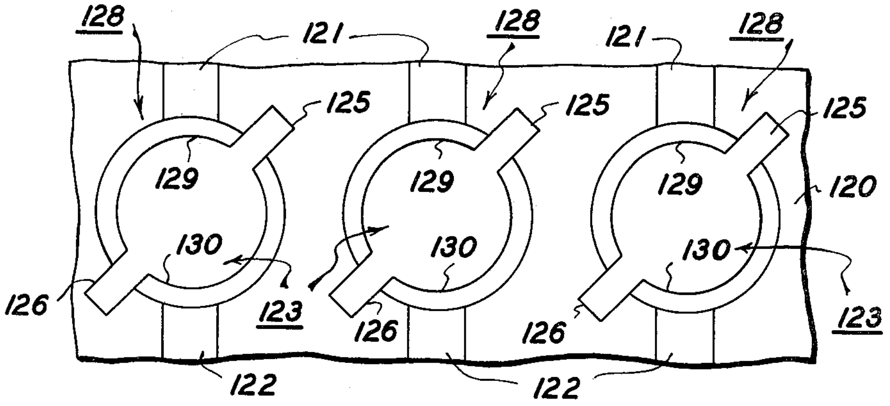

FIG. 9 is a schematic of an array of charging electrodes of the type shown in FIG. 6 and a supporting substrate illustrating another method of manufacture for the array.

DETAILED DESCRIPTION

Figure 1:
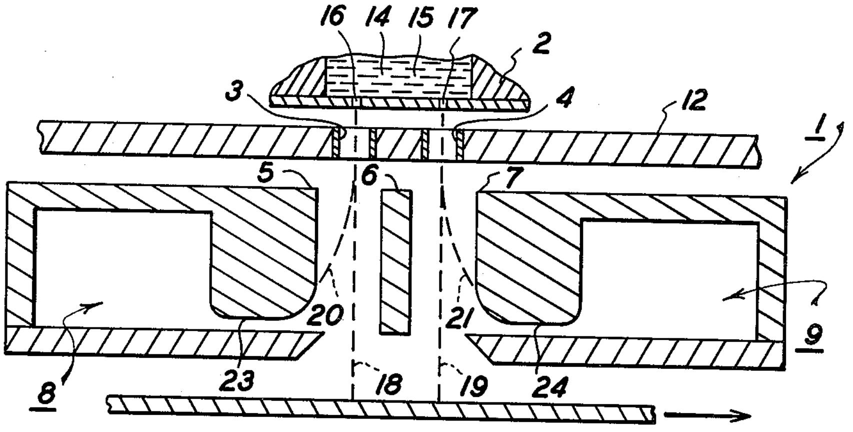
FIG. 1 is side view schematic of a multiple nozzle, binary ink drop printer employing the present invention.

The binary ink drop printer 1 of FIG. 1 is of the type disclosed in U.S. Pat. No. 3,701,998 (see FIG. 2) and in U.S. Pat. No. 4,035,812 (see FIGS. 2, 3 and 7). The disclosures of those patents are hereby expressly incorporated by reference into the present specification. The printer 1 includes: a drop generator 2; the charging electrodes 3 and 4; the drop deflection electrodes 5, 6 and 7; the drop collection gutters 8 and 9; and the target 10 with the arrow 11 depicting the movement of the target relative to the apparatus 2–9. The member 12 is an electrically insulating substrate for supporting charging electrodes.

The drop generator includes the chamber 14 containing a liquid ink 15 under pressure. The ink is emitted through nozzles 16 and 17 in continuous streams to the region of the charging electrodes 3 and 4 where the drops are formed. The formation of the drops at a fixed distance from the nozzles, the size of the drops and the spacing between drops is substantially constant due to a sonic stimulation of liquid 15 by a piezoelectric transducer (not shown) coupled to the chamber 14. The creation of uniform drop streams is also possible by mechanically vibrating the generator 2 or by electrohydrodynamically stimulating the liquid as it leaves the nozzles.

Typically, the liquid 15 is electrically grounded and drops formed from the liquid have a zero or near zero net charge. These uncharged or zero charge drops follow the undeflected trajectories indicated by dashed lines 18 and 19 to the target. In this embodiment, the print drops are charged to a zero or near zero level by a ground or zero voltage coupled to the charging electrodes 3 and 4.

Drops are also charged to a gutter level by the charging electrodes 3 and 4. A gutter voltage, for example, +50 volts, is coupled to an electrode 3 or 4 at or just before the moment of drop formation to charge the drop to a non-zero level proportional to the 50 volts. The gutter drops are deflected by an electrostatic field established between deflection electrodes 5, 6 and 7 into one of the gutters 8 and 9. The gutter drops follow electrostatically deflected trajectories represented by the dashed lines 20 and 21.

The nozzles 16 and 17 and the charging electrodes 3 and 4 are typical of a plurality of like nozzles and electrodes in two linear arrays. The specific electrodes 3 and 4 are single electrodes from the two arrays. Each array is offset by one pixel position to permit a closer packing of the nozzles and charging electrodes. Together the two arrays operate as if they were a single linear array with a number of nozzles equal to the combined number in the two linear arrays. The electrical data or video signals supplied to the second row of nozzles is delayed in time to allow the target 10 to move the distance separating the two arrays. A single scan line on the target is therefore formed from drops emitted by nozzles from both arrays. Of course, a single row or more than two rows of nozzles may be desirable for different printing systems.

The present invention is directed toward method and apparatus for coupling print and gutter voltages to the electrodes 3 and 4. An improved printer is obtained by making a charging electrode with two sections and using a matrix network coupled to the two sections to address individual charge electrodes.

Figure 2:
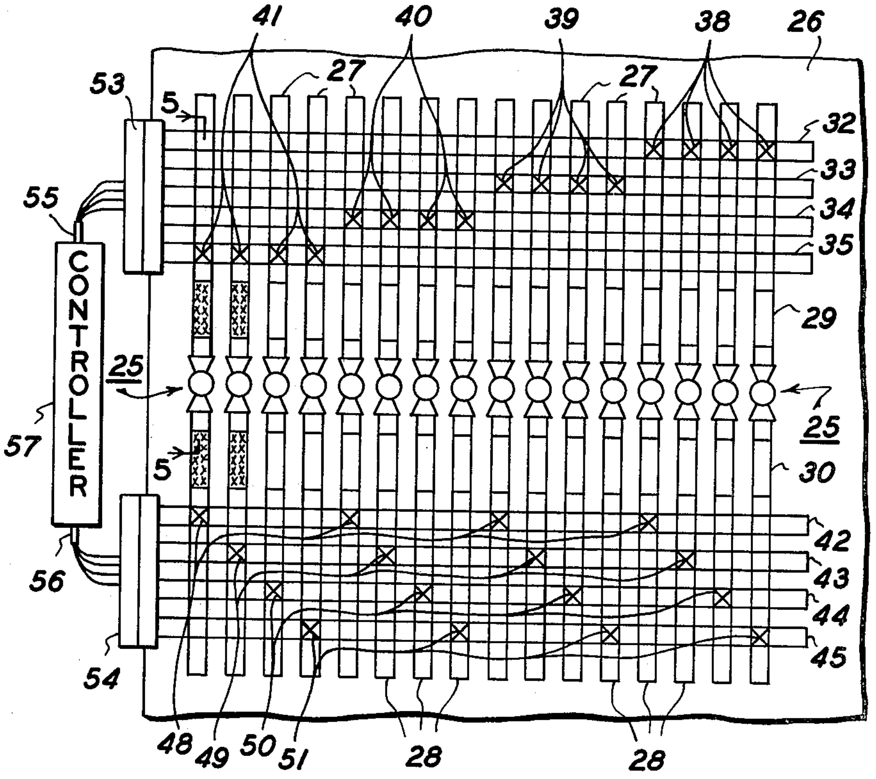
FIG. 2 is a plan view schematic of an array of two section charging electrodes coupled to matrix address lines according to this invention.

A matrix addressed, two section charging electrode array is shown in FIG. 2. A single array of two section electrodes 25 are described for ease of discussion. FIG. 3 illustrates the offset arrangement for electrodes 25 for use in the two rows of printer 1. One array or row is represented by charging electrodes 3 and the other by electrode 4 in FIG. 1.

The charging electrodes 25 shown in FIG. 2 include voltage divider networks to form the two sections of the charging electrodes. However this embodiment is also representative of other embodiments of a two section charging electrode as will be more apparent in connection with the discussion of FIGS. 6 through 9. First, the matrix concept for addressing the individual sections is discussed in connection with FIG. 2.

The electrodes 25 are supported by substrate 26 corresponding to substrate 12 in printer 1 of FIG. 1. Each electrode 25 has upper and lower parallel connectors 27 and 28 electrically coupled to first and second sections of a charging electrode represented in this embodiment by thin film resistors 29 and 30. The connectors 27 and 28 are thin conductive metal strips formed on the top side of the substrate 26 by conventional printed circuit board techniques.

Four parallel, segment input lines 32–35 are metal conductors formed on the bottom side of substrate 26. The lines 32–35 are generally orthogonal to conductors 27 and make electrical connection with the conductors 27 at the crossover locations indicated by the x's 38–42 at which metal through hole connectors 36 (shown in FIG. 5) electrically couple lines 32–35 and lines 27 together. Segment line 32 is coupled to four adjacent connectors 27 by the four through holes 38 with lines 33, 34 and 35 being electrically connected to successive groups of four connectors 27 by the groups of four through holes 39, 40 and 41 respectively.

Similarly, the four parallel, data input lines 42–45 are thin film metal connectors formed on the bottom side of substrate 26. Lines 42–45 are orthogonal to the lower connectors 28 and are electrically coupled to them as indicated by the intersections marked by the x's 48–51. The data lines and connectors 28 are coupled by metal through hole connectors like through holes 36 for the segment lines and connectors 27 (shown in FIG. 5). Data line 42 is coupled to the leftmost connector 28 and every fourth connector 27 to the right as indicated by the x's or through holes 48. Similarly, data lines 43–45 are coupled to every fourth connector 28 by the groups of four through holes 49–51 respectively.

The four segment and four data lines are electrically coupled to four-pin, board connectors 53 and 54 which in turn are coupled as represented by leads 55–56 to controller 57. The controller may be a microprocessor such as an Intel 8080 and appropriate peripheral devices or the like appropriately programmed to orchestrate all the operation of the printer 1. The controller contains all or a portion of the video signals or data to be recorded on target 11. The recording or printing occurs logically in a rectangular raster pattern made up of, for example, 4975 scan lines each having 3844 pixels. In the example under discussion, the numbers are reduced to sixteen pixels for ease of understanding. The 4×4 matrix of FIG. 2 would be expanded to a 62×62 matrix to print the 3844 pixel scan line. The general case is an M×N matrix. Also, two or more groups of matrices can be used in place of a single matrix. For example, two 31×62 matrices can be used in place of the single 62×62 matrix.

An individual charging electrode is electrically addressed by controller 57 when a print voltage, for example zero volts, is simultaneously coupled to both sections of a two section charging electrode, i.e. to the upper and lower connectors 27 and 28 coupled to a specific electrode 25. The normal voltage level coupled to the segment lines 32–35 and the data lines 42–45 is the gutter voltage, for example +50 volts. It follows therefore that the gutter voltage is normally coupled to both sections of all the two section electrodes via their connectors 27 and 28. All the drops charged during this period are charged to levels that cause the drops to follow trajectories such as paths 20 or 21. These gutter drops strike the deflection electrodes 5 or 7 (see FIG. 1) and flow over the surfaces of those members into the cavities 8 and 9 defining the gutters. The momentum of the liquid impacting plates 5 and 7 and the surface tension of the liquid enables the liquid to flow along the vertical-surfaces of members 5 and 7, around their curved ends 23 and 24 and into the cavities or gutters 8 and 9. The trajectory followed by all gutter drops is not the same. The gutter is designed to catch gutter drops flying different paths. The printer 1 gutters represented by cavities 8 and 9 are an example of such a design but other gutter arrangements are possible at the choice of the designer.

An electrode 25 having a gutter voltage applied to one connector, for example connector 27, and a print voltage coupled to the other connector 28, charges a drop to a level proportional to half the applied voltage, i.e. +25 volts for the example under discussion. This reduced charge level is selected to still cause a drop to intersect a plate 5 or 7 (in FIG. 1) and have the liquid flow into a cavity 8 or 9. Consequently, the lower charge level is still a gutter level and the drop is still properly referred to as a gutter drop.

Controller 57 cyclically address the multiple electrodes 25 at a given clock rate. A print voltage is first applied to segment line 32 for nearly the entire clock period. During the next three clock periods the print voltage is sequentially applied to segment lines 33–35 respectively thereby defining a duty clock cycle. The next and every duty cycle thereafter, a print voltage is applied for a half-clock period sequentially to the four segment lines. At all other times a gutter voltage is coupled to the segment lines. The charging voltages are applied to the charging electrodes synchronously with the formation of the drops. See the Sweet U.S. Pat. No. 3,596,275 for a discussion of that operation.

During the first clock period of a duty cycle, the charging electrodes coupled to segment line 32 are capable of generating print drops. In FIG. 2, the four adjacent charging electrodes to the far right are coupled via through holes 44 and upper connectors 27 to the segment line 32. The controller supplies print voltages in parallel to data lines 42–45 during this first clock period of a duty cycle according to the dictates of a given raster pattern image. A print voltage may appear on all four data lines 42–43, none or some combination of less than all four lines according to the raster image. A print voltage being applied to both sections of an electrode 25 causes the creation of a print drop. This print drop travels to its assigned pixel location on target 11 of printer 1. If no drop is needed for the pixel locations covered by a given charging electrode in the group activated by segment line 32, the data line for that pixel remains at the gutter potential. As explained above, even though a print voltage is coupled to the upper section of a charging electrode, the gutter voltage coupled to the lower section prevents the generation of a print drop and insures that the drop is made a gutter drop.

A print voltage on data line 42 during the first clock period of a duty cycle can not cause a print drop to be generated by the other charging electrodes to which it is coupled by through holes 48. The reason is that the upper sections of those electrodes are coupled to the gutter voltage at this time because only one segment line at a time is coupled to a print voltage.

During the second, third and fourth clock periods of a duty cycle, the remaining groups of electrodes 25 are capable of generating print drops in the same manner. The controller 57 keeps track of the segment line being addressed and applies print voltages to the data lines 42–45 in parallel according to the particulars of a given image being printed. The drop generation frequency necessary for a 62×62 matrix addressing 3844 charge electrodes is 217 kilohertz (kHz). This rate is within the ability of present printer designs. This rate assumes 350 nozzles per inch and a target velocity of 10 inches per second: 62×350×10=217 kHz.

An entire scan line is recorded during one duty cycle. The target 11 is transported by appropriate means (not shown) relative to the nozzles to position the next scan line under the nozzles for the next adjacent scan line. In the case of printer 1 of FIG. 1, the transport moves target 11 the distance separating trajectories 18 and 19 to align the drops into a single scan line on the target. A controller 57 in this case is programmed to apply half the video data associated with a scan line to charging electrodes 4 and thereafter the remaining half to electrodes 3.

The voltage divider or resistive divider embodiment of a two section charging electrode may be understood by reference to FIGS. 2, 4 and 5 wherein like elements are assigned like reference numbers. The charging electrodes 25 of FIG. 2 include a metal conductive cylinder or tunnel 62 and the resistors 29 and 28 electrically coupled to the tunnels. The tunnels have a diameter of from about two to four times that of a drop and ideally are aligned to the nozzles, such as 16 and 17 of a printer 1, so that a drop passes through it along its axis. The resistor 29 in electrical contact with tunnel 62 comprises a first section of the charging electrode and resistor 30 also in electrical contact with the tunnel comprises the second section of the charging electrode. As shown, a resistor 29 is coupled to an input segment line, for example line 32, via an upper connector 27 and a resistor 30 is coupled to an input data line, for example line 42, via a lower connector 28. The connections are typical for the other segment and data lines.

The controller 57 includes (see FIG. 4): a gutter voltage source represented by +V coupled to terminal 65 and 66; current limiting resistors 67 and 68 of three thousand ohms coupled to each segment line and data line; switches 70 and 71 coupled to the segment and data lines respectively; a print voltage source represented by the ground symbol coupled to the switches; and segment and data gate terminals 73 and 74. The switches are NPN transistors with their base electrodes coupled to the gate terminals 73 and 74, their collector electrodes coupled to the lines 32 and 42—for example—and their emitter electrodes coupled to the print voltage—e.g. ground 72.

The transistors are normally cut off leaving the gutter voltage normally applied to the segment and data lines. A gate signal applied to a gate 73 or 74 turns the transistor on thereby coupling the print voltage 72 to a segment or data line. The gate signals are applied to terminals 73 and 74 in the clocked manner described above. That is, a segment gate signal is applied to a terminal 73 during one clock period every duty cycle to partially activate the group of charging electrodes coupled to a particular segment line. Only one segment line at a time is coupled to the print voltage. Data gate signals are applied in parallel to all, none or some number of the data terminals 74 to fully activate the desired charging electrodes partially activated by a segment line. Activation means the generation of a print drop rather than of a gutter drop by a charging electrode.

When the gutter voltage +V is coupled to lines 32 and 42, the charging tunnel 62 is at the +V gutter potential. When either line 32 or line 42 is coupled to the +V gutter potential and the other is coupled to the ground print potential, the voltage at the charging tunnel 62 is one-half +V for the case when the resistors 29 and 30 have the same value. The resistors 29 and 30 form a simple voltage divider network. The potential of a tunnel 62 is the print potential—ground—when the print voltage is simultaneously coupled to lines 32 and 42—for example.

The board in FIG. 2 is fabricated as indicated by FIG. 5. First, holes are punched, drilled or otherwise formed in substrate 26 to accommodate the insertion of metal cylinders. The cylinders are hammered from both sides, i.e. riveted, to form the through holes 36 and charging tunnels 62. (The through holes alternately can be formed by an electroplating process). The top and bottom surfaces of substrate 26 are uniformly coated with a thin conductive metal by vapor evaporation in a vacuum. A photoresponsive chemical resist is coated over the conductive layers on both sides of the substrate. The top side of the substrate is exposed to a light pattern shaped to harden the resist in the regions corresponding to the shape of the upper and lower connectors 27 and 28. The bottom side of the substrate is exposed to a light pattern shaped to harden the resist in the regions corresponding to the shape of the segment and data input lines 32-35 and 42-45. Both sides of the substrate are then immersed into a chemical bath that removes the non-hardened resist and the underlying metal coating. Thereafter, the hardened resist is removed by an appropriate chemical bath.

The resistors 29 and 30 are fabricated by coating the entire top side of substrate 26 including the connectors 27 and 28 with another photoresponsive chemical resist. This resist is exposed to a light pattern to harden the resist everywhere except in the regions corresponding to the resistors 29 and 30. The resist is then removed chemically in the regions corresponding to the resistors 29 and 30. At this stage, a resistive material is vacuum deposited onto the regions to be occupied by resistors 29 and 30. The excess resistive material is removed along with the chemical resist when the board is subjected to another appropriate chemical bath. Other known techniques for applying thick film resistors to circuit boards can also be used if desired.

FIGS. 6-9 depict another embodiment of a two section charging electrode that can be substituted for the electrodes 25 in FIG. 2. Referring to FIG. 6, the two section charging electrode 80 includes the conductive metal half-cylinders 81 and 82. The two half-cylinders are the two sections of the charging electrode. An ink drop 83 is shown located at the center of the two sections 81 and 82. The ink 83 is electrically grounded, for example. The dashed line 84 represents the connection of the ink to a ground 85. This is conventionally done by grounding the generator 2 of FIG. 2, for example. A gutter voltage of +V on a single section of an electrode, for example on line 32, induces charge in the grounded ink 83 that is determined by the expression $Q=VC$. Q is the induced charge; V is the potential difference between the ink 83 and the half-cylinder 81—+V in this example; and C is the capacitance of the structure which is directly proportional to the surface area of the half-cylinder 81. The induced charge is the desired gutter level making the drop a gutter drop.

When the +V gutter voltage is simultaneously applied to both sections of electrode 80 by segment line 32 and data line 42, for example, twice the amount of charge is induced on a drop 83 formed during that time. The reason is that the surface area of the capacitor is doubled thereby doubling the capacitance even though the potential drop between the two half-cylinders and ink 83 is still +V. This greater charge level is still a gutter level since the drop is deflected into a gutter such as gutter 8 and 9 in FIG. 1.

The preferred shape for a charging tunnel is cylindrical because a zero net bending force is exerted on the continuous stream of liquid and the emerging drop. The two half-cylinders provide two sections that approximate the symmetry of a full cylinder. Flat plates or other shapes can be used in place of the half-cylinders. The non-symmetrical bending forces can be compensated for by mechanical alignment of the nozzles to the target and by appropriate electrical biasing.

The bending force exerted on a drop 83 is only a meaningful factor when the gutter voltage is placed on one half-cylinder and not the other. Since a wide latitude in drop trajectories is allowed for gutters of the type represented in FIG. 1, this bending need not be compensated for by added means. In other systems, compensation may be desirable. FIG. 7 illustrates a two-section charging electrode 90 that maintains symmetry regardless whether a gutter voltage is applied to one or both sections of the electrode.

Electrode 90 includes a first section made up of quarter-cylinders 91 and 92 and a second section made up of quarter-cylinders 93 and 94. The elements 91 and 92 and 93 and 94 are electrically coupled to each other by the conductors 95 and 96. When coupled to a +V potential—for example, the plate electrodes 91 and 92 subject ink at the center thereof (not shown in this figure) to a symmetrical charging potential. The same is true for plate electrodes 93 and 94. The ink in either case is not subjected to any meaningful bending force. Again, the elements 91–94 can be flat plates or other shapes besides the preferred partial cylinder shapes. Also, symmetry is not always desired with either electrodes 80 or 90. A certain amount of non-symmetry to the charging field may be chosen to have gutter drops having two different charge levels follow closer trajectories to a gutter.

FIGS. 8 and 9 illustrate two different embodiments of the partial-cylinder or multiple element electrodes 80 and 90. The board 100 is like substrate 26 in FIG. 2. It includes the upper and lower connectors 101 and 102 like connectors 27 and 28. Pre-punched (or otherwise formed) holes 103 are electroplated or the like to create conductive, cylindrical tunnels. The substrate 100 is then sawed into parts 105 and 106 along a line running through the centers of the holes 103. Thereafter, the substrate halves 105 and 106 are rejoined with the spacer elements 107 inserted as shown. The spacers are electrically insulating. The resultant structure gives rise to the two element, charging electrodes 108. The half-cylinders 109 and 110 comprise the first and second sections of these electrodes.

In FIG. 9, the substrate 120 and connectors 121 and 122 are also like substrate 26 and connectors 27 and 28 in FIG. 2. Pre-punched (or otherwise formed) holes 123 are electroplated or the like to create conductive, cylindrical tunnels. The substrate 120 is then cut to form the square shaped holes 125 and 126 in the substrate 120. The square shape of holes 125 and 126 is selected for ease of illustration. These holes are formed by punching or broaching the substrate and the conductive tunnels with an arrow-head punch device inserted into the holes 123. The severed tunnels define the two section, charging electrode 128. The half-cylinders (or nearly so) 129 and 130 comprise the two sections of electrodes 128.

Other modifications and variations of this invention will occur to those of ordinary skill in the art. These modifications and variations are intended to be within the scope of this invention. For example, in the example given using the +V and ground potentials, one of the two gutter charge levels given to a gutter drop can be selected to be the print level. In this case, the charge levels associated with the ground potential and the other gutter charge level are the new gutter charge levels. Clearly, different voltages besides ground potential can be coupled to the ink and other potentials besides that coupled to the ink can be used for the print voltage. The essential aspect here is that at least one unique combination of voltages applied to the two section electrode of this invention causes the generation of print drops and all others cause the generation of gutter drops.

I claim:

1. Binary ink drop printing apparatus comprising a drop generator including M×N number of nozzles for emitting under pressure continuous streams of liquid from which ink drops are formed toward a target to be printed, drop deflection means for electrostatically deflecting charged drops with print drops following a trajectory to a target and gutter drops following a trajectory to a gutter means, M×N number of two section, drop charging means located at the region at which drops are created from a stream for charging print drops to a print level permitting them to reach a target for printing and for charging gutter drops to a gutter level permitting them to be collected by gutter means and matrix means for coupling print and gutter voltages to the two sections of the charging means to charge drops to either a print or a gutter level including M segment line means for coupling to one section of the charging means and N data line means for coupling to the other section of the charging means.

2. The apparatus of claim 1 wherein the two sections of each charging means include at least two separate electrodes adjacent the ink drops at the region of their formation for charging drops to a print level when a print voltage is simultaneously coupled to both electrodes and for charging drops to a gutter level when a gutter voltage is simultaneously coupled to either or both electrodes.

3. The apparatus of claim 2 wherein the two sections of a charging means includes more than two separate electrodes with at least one section including at least two electrodes electrically coupled together.

4. The apparatus of claim 3 wherein the charging electrode includes four or greater even number of separate electrodes of substantially the same geometry symmetrically arranged about the region of drop formation to exert a near zero bending force to the continuous stream and the drops during charging of the drops.

5. The apparatus of claim 4 wherein each electrode includes nearly a quarter cylinder.

6. The apparatus of claim 2 wherein the electrodes include partial sections of cylindrical tunnels.

7. The apparatus of claim 2 wherein each electrode includes nearly a half cylinder.

8. The apparatus of claim 1 wherein the charging electrode includes circuit means coupled to a single charging electrode tunnel for charging drops to the print level only when a print voltage is simultaneously applied by the matrix means at two different terminals of the circuit means.

9. The apparatus of claim 8 wherein the circuit means includes first and second resistors coupled to a charging electrode as a voltage divider with print drops being generated when a print voltage is coupled to both the first and second resistors and gutter drops are generated when a gutter voltage is coupled to either or both resistors.

* * * * *